US012714987B2

(12) United States Patent
Kang et al.

(10) Patent No.: US 12,714,987 B2
(45) Date of Patent: Aug. 25, 2026

(54) CATALYST FOR HYDROGEN PEROXIDE SYNTHESIS AND REGENERATION

(71) Applicant: HEESUNG CATALYSTS CORPORATION, Gyeonggi-do (KR)

(72) Inventors: Dong Kun Kang, Gyeonggi do (KR); Ho Dong Kim, Incheon (KR); Hyun A Choi, Incheon (KR); Young-san Yoo, Incheon (KR); Jung Min Seo, Gyeonggi do (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 566 days.

(21) Appl. No.: 18/255,400

(22) PCT Filed: Nov. 18, 2021

(86) PCT No.: PCT/KR2021/016939
§ 371 (c)(1),
(2) Date: Jun. 1, 2023

(87) PCT Pub. No.: WO2022/119192
PCT Pub. Date: Jun. 9, 2022

(65) Prior Publication Data

US 2024/0001345 A1 Jan. 4, 2024

(30) Foreign Application Priority Data

Dec. 4, 2020 (KR) ........................ 10-2020-0167974

(51) Int. Cl.
*B01J 23/63* (2006.01)
*B01J 21/04* (2006.01)
(Continued)

(52) U.S. Cl.
CPC ............... *B01J 23/63* (2013.01); *B01J 21/04* (2013.01); *B01J 23/10* (2013.01); *B01J 35/31* (2024.01);
(Continued)

(58) Field of Classification Search
CPC ........ B01J 23/63; B01J 35/647; B01J 35/393; B01J 35/615; B01J 35/613; B01J 35/31;
(Continued)

(56) References Cited

FOREIGN PATENT DOCUMENTS

| | | |
|---|---|---|
| CN | 101497040 | 8/2009 |
| CN | 102626618 | 8/2012 |

(Continued)

OTHER PUBLICATIONS

International Search Report and Written Opinion were mailed on Mar. 7, 2022 by the International Searching Authority for International Application No. PCT/KR2021/016939 filed on Nov. 18, 2021 and published as WO2022119192 (Applicant—Heesung Catalysts Corporation) (6 pages).

*Primary Examiner* — James A Fiorito
(74) *Attorney, Agent, or Firm* — Ballard Spahr LLP

(57) ABSTRACT

Described is a catalyst obtained by supporting magnesium and cerium on activated alumina, firing same to immobilize the metals, and then impregnating same with palladium and performing reduction thereon, and is applied, when hydrogen peroxide is prepared by means of an anthraquinone process, to operation solution regeneration or hydrogenation, and thus an efficient regeneration conversion rate or synthesis yield is achieved.

7 Claims, 2 Drawing Sheets

(51) Int. Cl.

| | |
|---|---|
| ***B01J 23/10*** | (2006.01) |
| ***B01J 35/30*** | (2024.01) |
| ***B01J 35/31*** | (2024.01) |
| ***B01J 35/61*** | (2024.01) |
| ***B01J 35/63*** | (2024.01) |
| ***B01J 35/64*** | (2024.01) |
| ***B01J 37/02*** | (2006.01) |
| ***B01J 37/08*** | (2006.01) |
| ***B01J 37/16*** | (2006.01) |
| ***C01B 15/023*** | (2006.01) |

(52) U.S. Cl.

CPC ........... *B01J 35/393* (2024.01); *B01J 35/397* (2024.01); *B01J 35/399* (2024.01); *B01J 35/613* (2024.01); *B01J 35/615* (2024.01); *B01J 35/633* (2024.01); *B01J 35/647* (2024.01); *B01J 37/0201* (2013.01); *B01J 37/088* (2013.01); *B01J 37/16* (2013.01); *C01B 15/023* (2013.01); *B01J 2235/30* (2024.01)

(58) Field of Classification Search

CPC ...... B01J 35/633; B01J 35/397; B01J 35/399; B01J 21/04; B01J 23/10; B01J 37/0201; B01J 37/088; B01J 37/16; C01B 15/023

See application file for complete search history.

(56) References Cited

FOREIGN PATENT DOCUMENTS

| | | |
|---|---|---|
| JP | 2006/511334 | 4/2006 |
| KR | 10-0621946 | 9/2006 |
| KR | 10-2009-0006733 | 1/2009 |
| WO | WO 2004/060553 | 7/2004 |

CATALYST FOR HYDROGEN PEROXIDE SYNTHESIS AND REGENERATION

CROSS-REFERENCE TO RELATED APPLICATIONS

This application is a U.S. National Phase Application of International Application No. PCT/KR2021/016939, filed Nov. 18, 2021, which claims the benefit to Korean Application No. 10-2020-0167974, filed Dec. 4, 2020, each of which are hereby incorporated by reference in their entirety.

TECHNICAL FIELD

The present disclosure relates to a catalyst for producing hydrogen peroxide using an anthraquinone process and for regenerating a working solution.

BACKGROUND ART

Hydrogen peroxide ($H_2O_2$) is a chemical product used in various fields such as brighteners, disinfectants, pharmaceuticals, oxidizing agents, and the like. Hydrogen peroxide is produced either by using a direct synthesis method using hydrogen and oxygen or using an anthraquinone process, which involves successive hydrogenation and oxidation processes from anthraquinone-based compounds. The anthraquinone process is to be briefly described.

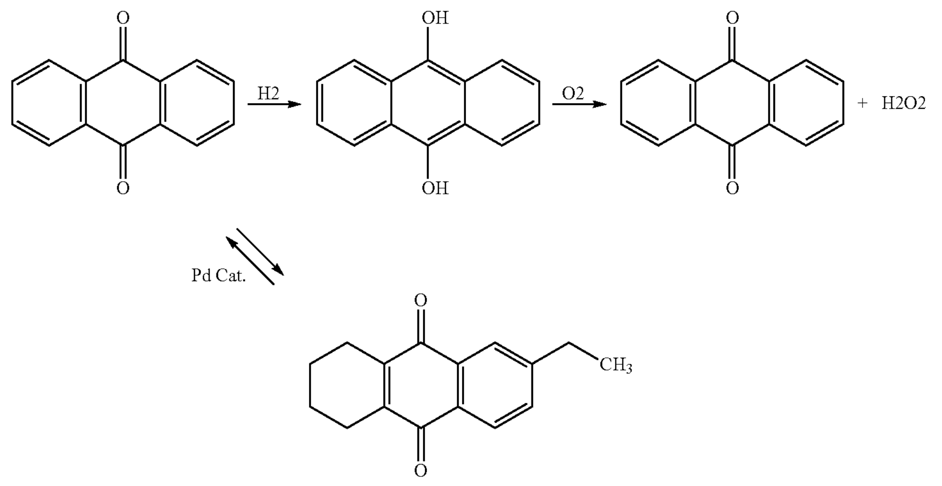

Hydrogen peroxide is produced by performing hydrogenation and oxidization multiple times on a working solution in which alkyl anthraquinone (commonly referred to as 2-ethyl-anthraquinone, EAQ) is dissolved in a suitable organic solvent. When performing such hydrogenation and oxidation multiple times, tetrahydroanthraquinone and the like, which are by-products, are accumulated in the working solution. In addition, coke deposition on a catalyst results in decreases in the production and regeneration efficiencies of hydrogen peroxide. In particular, disclosed is a technology using a catalyst obtained by heating a working solution at a temperature in a range of 40° C. to 150° C., supporting magnesium on activated alumina, and treating ammonia before performing firing when regenerating tetrahydroanthraquinone (THAQ), the by-product, to anthraquinone (Korean Patent Application Publication No. 10-2009-0006733).

DISCLOSURE

Technical Problem

Still, there is a demand for developing a catalyst capable of promoting a hydrogenation process in hydrogen peroxide production while improving regeneration efficiency. In particular, it is necessary to develop a high-efficiency catalyst capable of adjusting the dispersion and particles of an active metal by controlling the pore structure of a carrier. Therefore, a technical objective to be achieved by the present disclosure is to prepare a catalyst used in regeneration and synthesis reactions of hydrogen peroxide as well as having excellent catalytic activity. In addition, another objective of the present disclosure is to provide a ring-type palladium catalyst having improved durability and active stability to overcome issues regarding deactivation of the catalyst and loss of the active metal due to abrasion, which is a problem with repeated use.

Technical Solution

The inventors of the present disclosure developed a catalyst having increased density of an active metal in the carrier by positioning a palladium active layer in a ring-like form in the carrier with a controlled pore structure while having improved dispersion of palladium particles by introducing magnesium and cerium. In addition, even though coke is deposited inside the catalyst, when introducing a cerium component during a regeneration process, coke residues inside the catalyst can be completely removed, and dispersion loss of palladium can be minimized, thereby obtaining a durable catalyst with maintainable regeneration efficiency. Furthermore, in the prepared catalyst, the active metal is positioned inside the carrier, thereby inhibiting a loss of the active metal due to abrasion caused during the reaction. As a result, catalyst durability can be improved.

The present disclosure relates to a catalyst capable of improving regeneration efficiency of a working solution while promoting a hydrogenation process in a hydrogen peroxide production process using an anthraquinone process.

The inventors of the present disclosure found out that when using a catalyst obtained by supporting magnesium and cerium on gamma alumina, performing firing, and then introducing and reducing palladium for regenerating a working solution, regeneration and transformation were able to be efficiently performed. Surprisingly, the inventors found out that the catalyst was able to be used as a catalyst for a hydrogenation step during an anthraquinone production process.

The present disclosure provides a catalyst applied to a hydrogenation step in hydrogen peroxide production using an anthraquinone process including the hydrogenation step, or a catalyst for regenerating a working solution used in hydrogen peroxide production using the anthraquinone process. The catalyst has a form in which a palladium component is uniformly distributed in a ring-like form in gamma alumina particles, and magnesium and cerium components are uniformly distributed in the gamma alumina. Without limitation, in the catalyst according to the present disclosure, palladium active metal may be spaced inward from the surface of the gamma alumina carrier by a distance in a range of 5 μm to 8 μm and present in a ring-like form with improved durability. The gamma alumina may have a pore size in a range of 6.0 nm to 9.0 nm and a pore volume in a range of 170 $m^3/g$ to 220 $m^3/g$. In addition, palladium may be present at an active density in a range of 0.023 wt $\%/m^2$ to 0.071 wt $\%/m^2$ in the gamma alumina carrier, magnesium may be uniformly present at a density in a range of 0.02 wt $\%/m^2$ to 0.18 wt $\%/m^2$ in the gamma alumina carrier, and cerium may be uniformly present at a density in a range of 0.001 wt $\%/m^2$ to 0.008 wt $\%/m^2$ in the gamma alumina carrier. In addition, a chlorine component may be uniformly present at a density in a range of 0.004 wt $\%/m^2$ to 0.03 wt $\%/m^2$ in the gamma alumina carrier.

Advantageous Effects

A catalyst for synthesizing and regenerating hydrogen peroxide, according to the present disclosure, has a ring-shaped structure in which palladium, an active metal, is integrated inside a gamma alumina carrier in a predetermined distribution. In addition, the gamma alumina carrier has controlled internal pores so that reactants and products are allowed to easily pass therethrough. Furthermore, high palladium dispersion is induced by introducing magnesium and cerium into the carrier. The catalyst, according to the present disclosure, inhibits the aggregation of the active metal and increases the number of active sites of palladium, thereby achieving maximum reaction activity. In addition, palladium, the active metal, can be preserved from physical abrasion of the catalyst caused during the catalysis using a fluidized bed reactor, so the catalyst has high durability.

BEST MODE

Figure 1:
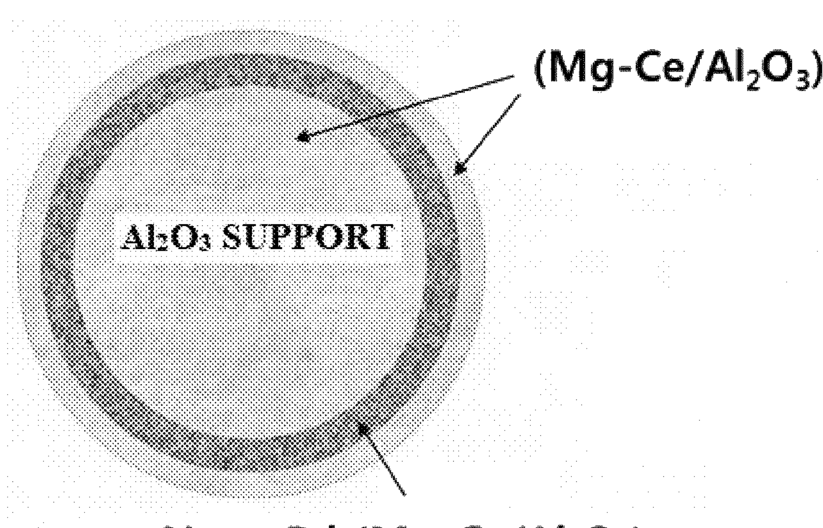
FIG. 1 is a schematic diagram illustrating a structure of a ring-type catalyst according to the present disclosure.
Figure 2:
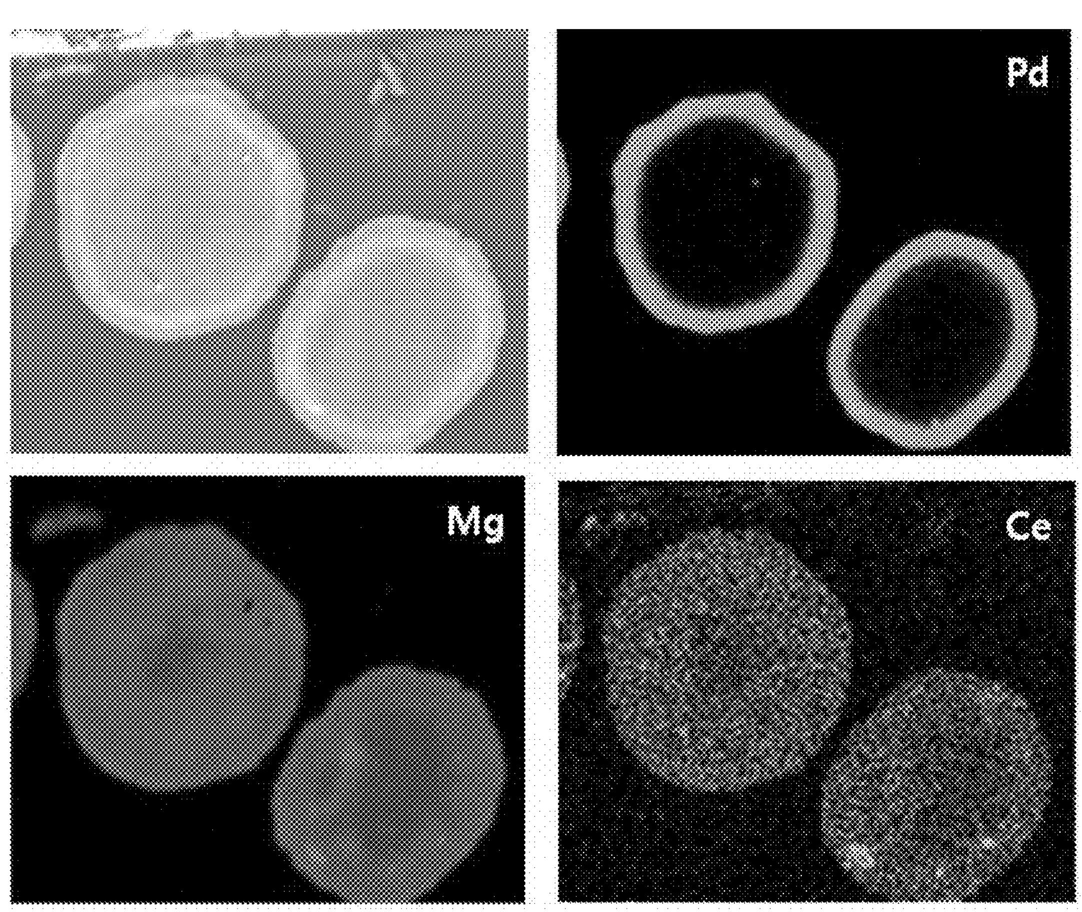
FIG. 2 is a diagram showing SEM and EPMA images for confirming a ring-shaped structure.

Hereinafter, the present disclosure will be described in detail.

The present disclosure relates to a catalyst obtained by supporting magnesium and cerium on activated alumina, performing firing to immobilize the metals, and then introducing and reducing palladium, which confirms efficient regeneration conversion rate or synthesis yield when being applied to a hydrogenation process or a regeneration process of a working solution. The inventors of the present disclosure controlled a sintering temperature of the activated alumina to control a pore structure of a carrier as well as a structure of supporting palladium, an active metal, thereby adjusting palladium dispersion.

Example 1

Activated alumina was used as a carrier, and boehmite (having a specific surface area of 270 $m^2/g$, manufacturer: BASF, Germany) was subjected to firing at a temperature of 750° C. for use. Magnesium nitrate ($Mg(NO_3)_2 6H_2O$) and cerium nitrate ($Ce(NO_3)_3 6H_2O$) were used as magnesium and cerium precursors, respectively, and tetrachloropalladinic acid ($H_2PdCl_4$) was used as an active metal precursor.

First, 4.5% of magnesium nitrate and 0.25% of cerium nitrate, with respect to the total weight of a catalyst, were mixed with ionized water. The prepared magnesium-cerium composition solution was introduced into the carrier using a dry-wetting method. The magnesium-cerium-supported composition was subjected to a heat treatment process at a temperature of 550° C. for 2 hours in an air atmosphere to immobilize the metals. Thereafter, 100 g of the magnesium-cerium-supported composition was added to 200 ml of water. Then, 1.0% of the palladium precursor, 1.0% of hydrogen peroxide, and 0.2% of HCl, with respect to the total weight of the catalyst, were added and stirred while raising a temperature to 80° C. The raised temperature was maintained for 30 minutes.

A catalytic reduction process was performed by introducing a reducing agent into the composition on which magnesium-cerium-palladium was supported. Sodium formate (NaCOOH) was used as the reducing agent. During the reduction, a temperature was raised to 60° C. so that Na was ionized to generate sufficient hydrogen. The raised temperature was maintained for 1 hour.

In the prepared catalyst, magnesium and cerium were uniformly distributed inside the carrier. Palladium mainly showed a ring-shaped structure distributed in a thickness in a range of 10 um to 20 um while being spaced inward from the periphery of the carrier. The Pd density of the prepared catalyst was calculated to be 0.0556 wt $\%/m^2$.

Example 2

A catalyst was prepared in the same manner as in Example 1, except that the carrier used in Example 1 was subjected to a sintering process at a temperature of 850° C. The corresponding catalyst showed the same ring-shaped structure as in Example 1. The Pd density of the prepared catalyst was calculated to be 0.0714 wt $\%/m^2$.

Example 3

The carrier used in Example 1 was subjected to a sintering process at a temperature of 1000° C. for use. When supporting palladium, hydrogen peroxide was not involved, and the amount of HCl introduced was increased to 0.4%. Like Example 1, the corresponding catalyst had a form in which magnesium and cerium were uniformly distributed inside the carrier, and palladium showed an egg-shell structure in the catalyst. The Pd density of the prepared catalyst was calculated to be 0.0233 wt $\%/m^2$.

Example 4

The carrier used in Example 1 was subjected to a sintering process at a temperature of 1100° C. for use. When supporting palladium, hydrogen peroxide was not involved, and the amount of HCl introduced was increased to 0.4%. The corresponding catalyst had a form in which all magnesium, cerium, and palladium were uniformly distributed inside the carrier. The Pd density of the prepared catalyst was calculated to be 0.0309 wt %/$m^2$.

Comparative Example 1

The carrier used in Example 1 was subjected to a sintering process at a temperature of 850° C., and when supporting palladium, the amount of HCl introduced was 0.4%. Like Example 1, the corresponding catalyst had a form in which magnesium and cerium were uniformly distributed inside the carrier, and palladium showed an egg-shell structure in the catalyst. The Pd density in the prepared catalyst was calculated to be 0.0097 wt %/$m^2$.

Comparative Example 2

The carrier used in Example 1 was subjected to a sintering process at a temperature of 850° C., and when supporting palladium, the amount of HCl being introduced was 0.75%. The corresponding catalyst had a form in which all magnesium, cerium, and palladium were uniformly distributed inside the carrier. The Pd density in the prepared catalyst was calculated to be 0.0057 wt %/$m^2$.

Performance Evaluation

Physical properties and pore structures of the carriers subjected to sintering in Examples and Comparative Examples are shown in Table 1.

TABLE 1

| No. | Carrier | Heat treatment temperature of carrier (° C.) | Carrier properties Crystalline phase (XRD) | Specific surface area ($m^2$/g) | Pore volume ($cm^3$/g) | Pore size (nm) |
|---|---|---|---|---|---|---|
| Example 1 | AlOOH | 750 | r-Al2O3 | 202 | 0.47 | 6.9 |
| Example 2 | AlOOH | 850 | r-Al2O3 | 180 | 0.43 | 8.0 |
| Example 3 | AlOOH | 1,000 | r-Al2O3 + Θ-Al2O3 | 131 | 0.41 | 8.9 |
| Example 4 | AlOOH | 1,100 | a-Al2O3 | 33 | 0.21 | 19.8 |
| Comparative Example 1 | AlOOH | 850 | Al2O3 | 180 | 0.49 | 8.0 |
| Comparative Example 2 | AlOOH | 850 | Al2O3 | 180 | 0.49 | 8.0 |

The structure of alumina, the carrier, is determined by the firing temperature. In addition, the higher the temperature, the smaller the specific surface area and the lower the physical strength. In a temperature range of 450° C. to 900° C., $Al_2O_3$ shows the gamma phase, and the specific surface area is in a range of about 160 $m^2$/g to 220 $m^2$/g. In a temperature range of 900° C. to 1,100° C., $Al_2O_3$ shows the theta phase, and the specific surface area is in a range of about 30 $m^2$/g to 140 $m^2$/g. Alumina, according to the present disclosure, may have a pore size in a range of 6.0 nm to 9.0 nm and a specific surface area in a range of 170 $m^3$/g to 222 $m^3$/g. When preparing the respective catalysts using the carriers in Table 1, the catalyst structures and Pd analysis characteristics are shown in Table 2. The dispersion and Pd particle size were calculated by measuring the amount of CO adsorbed onto Pd through CO chemisorption analysis (pulse method).

TABLE 2

| No. | Pd dispersion (%) | Pd particle size (nm) | Pd distribution type | Pd density in carrier (wt %/m2) |
|---|---|---|---|---|
| Example 1 | 48.5 | 2.5 | Ring | 0.0556 |
| Example 2 | 34.5 | 3.2 | Ring | 0.0714 |
| Example 3 | 25.6 | 4.4 | Egg-Shell | 0.0233 |
| Example 4 | 18.4 | 6.2 | uniform | 0.0309 |
| Comparative Example 1 | 28.5 | 3.6 | Egg-Shell | 0.0097 |
| Comparative Example 2 | 26.3 | 4.3 | uniform | 0.0057 |

Looking into Table 2, in Examples 1 and 2, the catalyst was prepared in a form in which palladium was distributed in a ring-like form while being spaced inward from the periphery of the catalyst by a distance in a range of 5 μm to 8 μm. Referring to Table 2, the higher the firing temperature of the carrier, the lower the palladium dispersion and the larger the palladium particle size. The catalysts prepared using alpha $Al_2O_3$ at a firing temperature of 1,100° C. were uniform-type catalysts, in which due to low specific surface area, the palladium dispersion was confirmed to be excessively low. On the other hand, in the catalysts of Examples 1 to 3, the palladium density is measured to be in a range of 0.023 wt %/m2 to 0.071 wt %/m2, the magnesium density is measured to be in a range of 0.02 wt %/m2 to 0.15 wt %/m2, the cerium density is measured to be in a range of 0.001 wt %/m2 to 0.008 wt %/m2, and optionally, the chlorine density is measured to be in a range of 0.005 wt %/m2 to 0.03 wt %/m2. In addition, a reaction for regeneration evaluation was performed to measure the regeneration efficiencies of the catalysts. An agitated reaction system made of SUS was used as a reactor for evaluation. A magnetic bar was placed in a circular stirring reactor. Then, 10 g of the catalyst was added to 50 g of a working solution, a by-product generated during a hydrogenation reaction, to measure the regeneration efficiency, which was measured using LC. The results thereof are shown in Table 3.

TABLE 3

| No. | Catalytic activity | Activity after catalyst regeneration | Pd amount after performing milling for 24 hours (wt %) | Activity after performing milling for 24 hours |
|---|---|---|---|---|
| Example 1 | 56.3 | 50.7 | 0.942 | 54.6 |
| Example 2 | 51.8 | 41.6 | 0.938 | 49.7 |

TABLE 3-continued

| No. | Catalytic activity | Activity after catalyst regeneration | Pd amount after performing milling for 24 hours (wt %) | Activity after performing milling for 24 hours |
|---|---|---|---|---|
| Example 3 | 43.5 | 35.2 | 0.905 | 41.0 |
| Example 4 | 22.5 | 16.4 | 0.918 | 19.9 |
| Comparative Example 1 | 50.7 | 38.2 | 0.897 | 48.1 |
| Comparative Example 2 | 49.1 | 36.8 | 0.922 | 46.5 |

In Examples and Comparative Examples, the ring-type palladium catalysts exhibited the best initial catalytic performance. In the case of the uniform-type catalysts in Examples 1 and 2, it was confirmed that the initial catalytic performance and the post-regeneration performance were excellent compared to the case of the catalyst having the egg-shell structure in Comparative Example 1 and the uniform-type catalyst in Comparative Example 2. This is attributable to the high palladium dispersibility of the catalyst. In addition, after applying a physical impact using a ball mill for 24 hours, only catalysts with predetermined sizes from which fine powder was removed were selected to evaluate the reaction. When continuously applying impact to the outside of the catalyst by ball milling, particles on the catalyst surface are broken and damaged due to the physical impact from outside, which shows the same tendency found in commercial processes. As a result of evaluating the catalyst subjected to ball milling for 24 hours, it was confirmed that the ring-type palladium catalysts as in Examples 1 and 2 maintained a performance not inferior to the initial performance. This means that the ring-type palladium catalysts are advantageous in terms of the loss of a palladium active material even when the surface is partially damaged. In addition, in the case of the uniform-type catalysts or the catalysts having the egg-shell structure in which the palladium active layer is unspaced from the surface, the loss of the catalyst surface particles means the loss of the palladium active material, which was confirmed by analyzing the results of the palladium amount in the catalyst.

The invention claimed is:

1. A catalyst comprising, a palladium component and a gamma alumina carrier, wherein the gamma alumina carrier defines a periphery of the catalyst, wherein the palladium component is distributed in a ring-like form and being spaced inward from the periphery of the catalyst, and wherein magnesium and cerium components are uniformly distributed in the gamma alumina carrier.

2. The catalyst of claim 1, wherein the alumina in the gamma alumina carrier has a pore size in a range of 6.0 nm to 9.0 nm and a specific surface area in a range of 170 $m^3/g$ to 222 $m^3/g$.

3. The catalyst of claim 1, wherein the gamma alumina carrier further comprises a chlorine component.

4. The catalyst of claim 1, wherein the palladium is present at an active density in a range of 0.023 wt $\%/m^2$ to 0.071 wt $\%/m^2$ in the gamma alumina carrier.

5. The catalyst of claim 1, wherein the magnesium is uniformly present at a density in a range of 0.02 wt $\%/m^2$ to 0.15 wt $\%/m^2$ in the gamma alumina carrier.

6. The catalyst of claim 1, wherein the cerium is uniformly present at a density in a range of 0.001 wt $\%/m^2$ to 0.008 wt $\%/m^2$ in the gamma alumina carrier.

7. The catalyst of claim 3, wherein the chlorine component is uniformly present at a density in a range of 0.005 wt $\%/m^2$ to 0.03 wt $\%/m^2$ in the gamma alumina carrier.

* * * * *